Feb. 25, 1947.    J. E. McBRIDE    2,416,634
APRON CONVEYER
Filed May 22, 1944    3 Sheets-Sheet 1
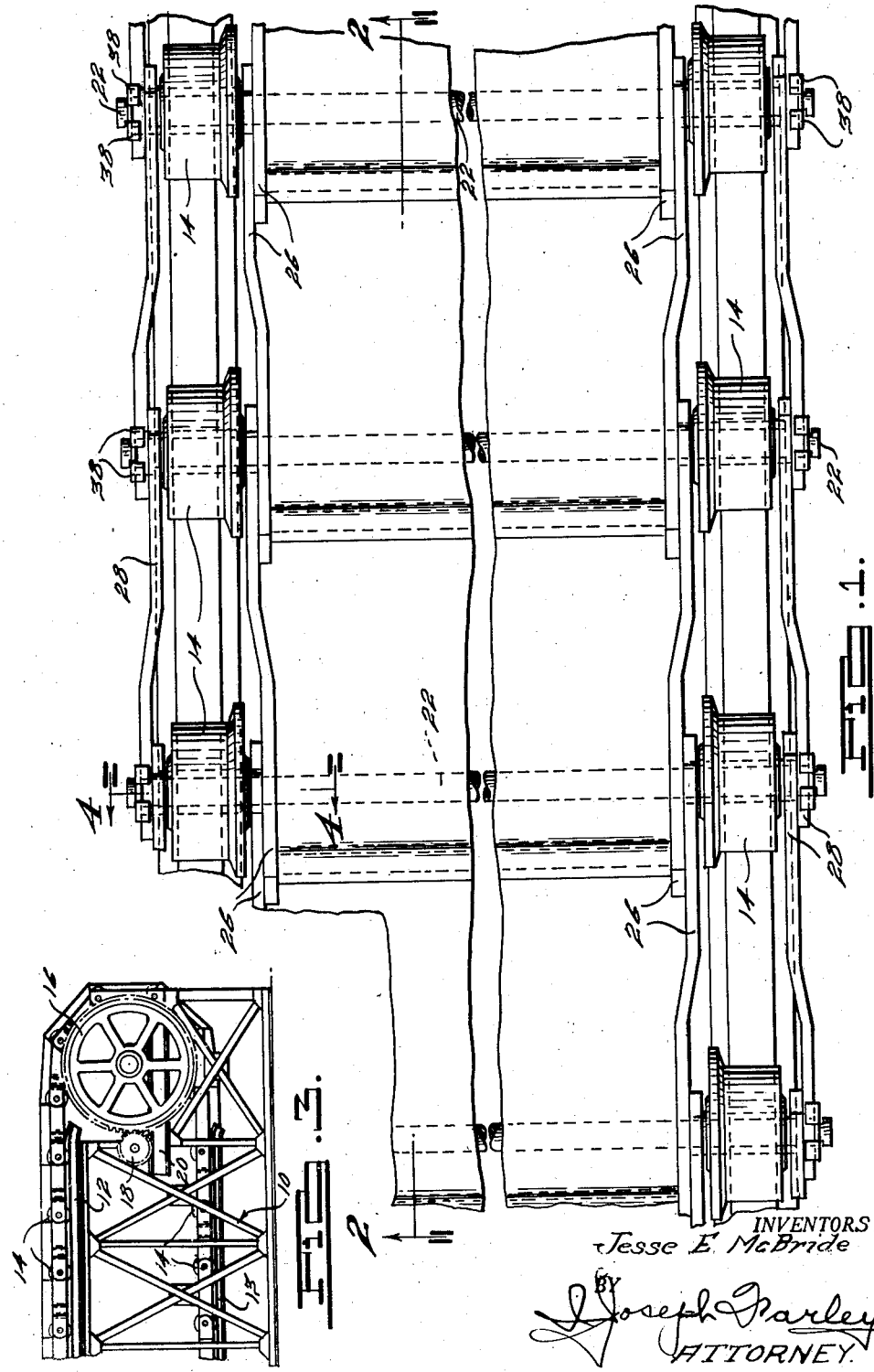
INVENTORS.
Jesse E. McBride
BY
Joseph Darley
ATTORNEY.

Feb. 25, 1947.　　J. E. McBRIDE　　2,416,634
APRON CONVEYER
Filed May 22, 1944　　3 Sheets-Sheet 2
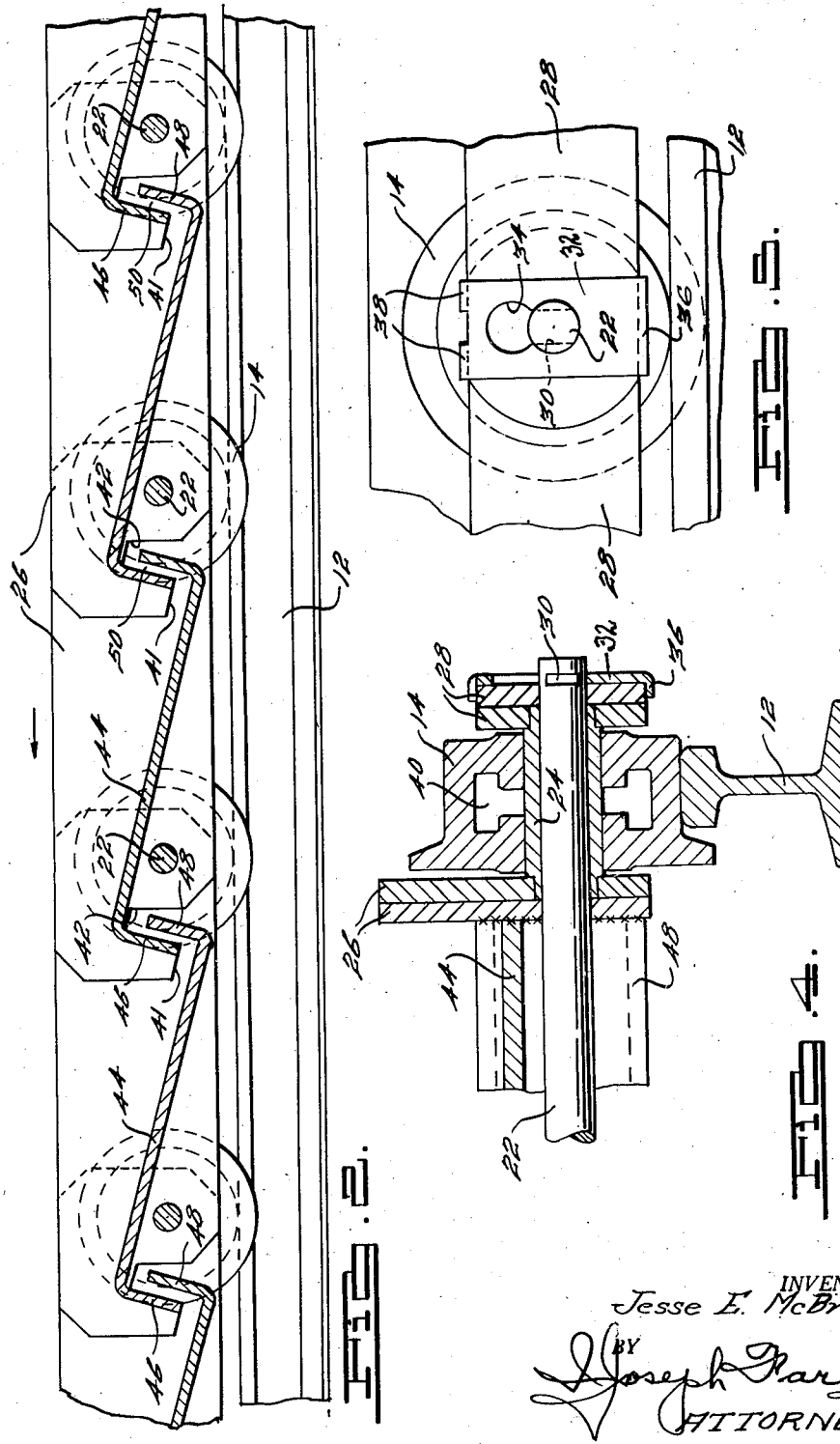
INVENTORS
Jesse E. McBride
BY
Joseph Farley
ATTORNEY

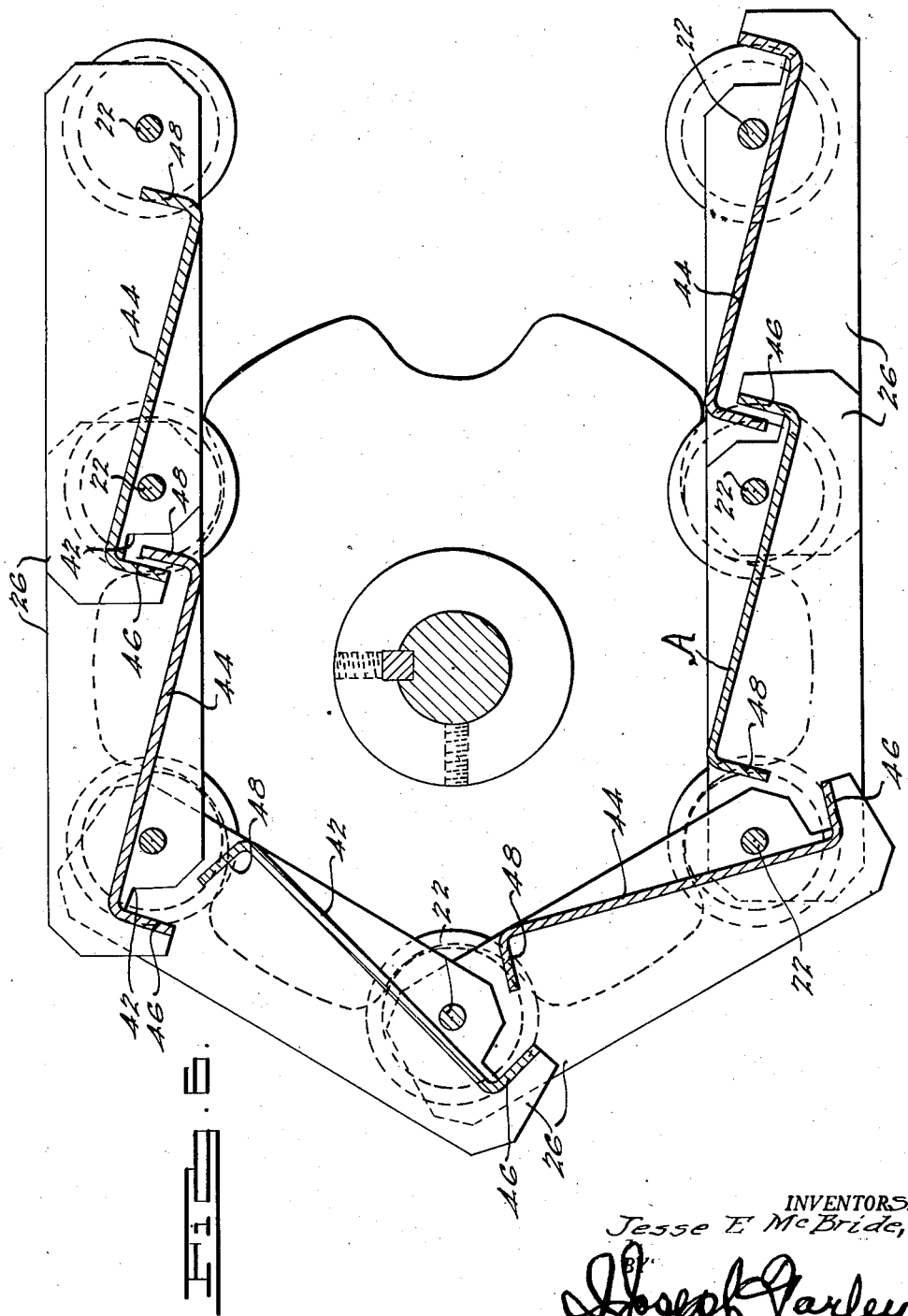

Patented Feb. 25, 1947

2,416,634

UNITED STATES PATENT OFFICE 2,416,634

APRON CONVEYER

Jesse E. McBride, Highland Park, Mich., assignor to Palmer-Bee Company, Detroit, Mich., a corporation of Michigan Application May 22, 1944, Serial No. 536,674

5 Claims. (Cl. 198—196)

1

This invention relates to apron conveyers designed for the handling of bulk material and more particularly for that type thereof known in the art as "leak-proof" conveyers.

These conveyers as heretofore constructed are in the form of an endless belt type of construction, the belt being made of a plurality of formed metal pans or apron sections usually constructed of sheet steel and each apron section being made up of a bottom plate and two side plates suitably secured together, and which are carried by a pair of transversely spaced chains. These chains are trained about pairs of transversely spaced sprockets of relatively large diameter and the conveyers are frequently of great length, depending upon the distance the material is to be carried. The apron sections are generally either supported upon outboard rollers rotatably mounted on the ends of gudgeons or upon through shafts which extend below the bottom of the aprons and to which the apron sections are articulated. The outboard rollers run along supporting tracks and support the load being carried on the upper or loaded run of the carrier and support the empty conveyer on the return run.

When the conveyers travel around the sprockets to pass from the upper to the lower run of the conveyer, the relationship of the adjacent apron sections to each other is obviously very considerable. Consequently, it is necessary to provide a considerable amount of overlap between the bottom and side plates of the adjacent apron sections in order to avoid the formation of open spaces between the apron sections through which the material could pass freely from the loaded section on the upper run. Considerable difficulty has heretofore been encountered in the construction and arrangement of the overlapping portions of the adjacent sections, in order to prevent the presence of such open spaces while at the same time constructing the overlapping portions so as to prevent the objectionable binding or wedging of the material being carried between such overlapping portions.

For reasons of economy of construction, conveyers generally, and particularly conveyers designed for the handling of bulk material, are always made of relatively rough unfinished or unmachined parts. Therefore, it is not commercially practical to construct the apron sections of apron conveyers so that the overlapping portions thereof engage with a precision fit. Therefore, it has been necessary to provide sufficient clearance between the overlapping portions of adjacent apron sections, and particularly the

2 bottom plates thereof, so that binding of such overlapping portions will be avoided, particularly when the conveyer passes around the end sprockets to reverse its direction of travel.

One of the types of construction most generally employed is to form the overlapping portions of the bottom plates of the apron sections with an upwardly curved transversely extending sectional area curved upon an arc which is struck from an axis coinciding with the center of the chain joint, there being, however, sufficient clearance, as above mentioned, between these curved overlapping portions so as to avoid binding. Consequently, when the conveyer is handling very fine materials, such material frequently becomes tightly wedged between the overlapping beaded edges of the bottom plates. Due to the fact that the curved beaded edges are curved upon an arc which coincides with the axis of the chain joint, the clearance space provided between the curved beaded overlapping portions of the adjacent apron sections remains substantially the same when the conveyer is travelling around sprockets to reverse its travel as when it is travelling along the upper loaded run thereof. Consequently, there is no chance for any material which may have become wedged between the overlapping portions of the adjacent bottom plates to be released in the ordinary operation of the conveyer. As the wedging of the material being carried between these overlapping portions tends to increase the clearance space originally provided, the wedging of the material becomes progressive during the continued use of the conveyer and frequently reaches a point such as to cause very objectionable bending or distortion of the overlapping edge portions of the adjacent sections. It will thus be seen that the progressive wedging action may become so great as to produce binding effects that throw such a heavy load upon the conveyer drive as to necessitate periodic stopping of the conveyer for removal of material which has become wedged between the overlapping portions thereof.

Another objection to the so-called "leak-proof" conveyers is the difficulty of providing a sufficiently cheap, economical construction in which sufficient clearance between the overlapping portions of both the bottom and side plates can be provided to prevent objectionable binding, while at the same time avoiding the presence or formation of open spaces through which the bulk material being handled may drop, as the conveyer sections are travelling along the upper loaded run of the conveyer and as the apron sections are passing around the sprockets from the upper to the lower run of the conveyor's travel.

The principal object of the present invention is to provide a new and improved construction for an apron conveyor in which the objections above noted will be obviated.

Another object is to provide a new and improved construction for the bottom plates or pans of the apron so that a wedging of the material between the adjacent overlapping sections will be prevented.

A further object is to provide a new and improved construction for the overlapping portions of the side plates of the apron sections to prevent leakage of material through and between adjacent side plates.

Still another object is to so construct the conveyor and the apron sections thereof that the overlapping of one apron section with the adjacent apron section is spaced from, and independent of, the chain joint so that as the apron sections pass around the sprockets an appreciable opening or separation of the overlapping portions of the adjacent apron sections will occur so as to permit the release of any particles of material that might have become caught between these overlapping portions as the conveyor was travelling along its upper horizontal run while at the same time providing a construction such that the material carried by such conveyor will be thoroughly supported both by the bottom and side plates of the apron section and in such a way as to prevent any leakage or seepage of the material through or between the apron conveyor.

A still further object is to provide a new and improved construction of the apron sections whereby the side plates will be integrally united to the bottom plate of each section in such a way that there will be no opening formed at the joint between the side edges of the bottom plate and the side plates through which leakage of material could occur.

The above and other objects, such as the provision of an apron conveyor which may be constructed at a comparatively low cost which will be efficient in operation with consequent low maintenance cost will appear more fully from the following more detailed description and by reference to the accompanying drawings forming a part hereof and wherein:

Fig. 1 is a fragmentary plan view of a conveyor constructed in accordance with the present invention;

Fig. 2 is a longitudinal sectional view of the same, taken on the line 2—2 of Fig. 1;

Fig. 3 is a view in elevation on a reduced scale showing one end of the conveyor, and the supporting and driving means therefor;

Fig. 4 is an enlarged sectional view taken on the line 4—4 of Fig. 1;

Fig. 5 is an enlarged detail view of the apparatus shown in Fig. 4, as viewed from the right side thereof; and Fig. 6 is an enlarged sectional view showing the action of the conveyor aprons as the conveyor passes around one of the sprockets.

The conveyor as shown in the drawings may be supported upon any suitable type of supporting frame or trestle 10, to which are secured upper and lower tracks 12 and 13 upon which ride the rollers 14 of the conveyor proper. A driving sprocket 16 is located at the end of the conveyor to propel the same in the known manner, and may itself be driven by means of suitable motor and gear means 18 mounted together with the sprocket 16 upon a platform 20. As shown in Figs. 1 and 2, cross shafts or rods 22 extend across under the apron sections of the conveyor and carry adjacent to their outer ends flanged supporting rollers 14, bushings 24 (see Fig. 4) preferably being interposed between said rollers and shafts. The shafts 22, in addition to serving as bearing supports for the rollers, also act as pivotal connections for the links of the driving chains, each of which consists of a plurality of relatively wide inner links 26, which form the side walls of the aprons, and relatively narrow outer links 28, which supplement the inner links to form the driving chains. Each link is bent intermediate its ends, as shown in Fig. 1, so that the trailing ends of each pair of links are disposed within the leading ends of the next following pair of links. In order to retain the links and rollers in assembled relation upon the shafts 22, the ends of the shafts are provided with opposite vertically extending slots 30, adapted to be straddled and engaged by a keeper plate 32 provided with a keyhole slot 34 having an upper circular portion through which the end of the shaft 22 is adapted to pass, and a lower rectangular portion which engages snugly within the slot 30. The plate 32 has a lower flange 36 which engages the lower edge of the outer link 28, and a pair of upper flanges 38 which may be bent over to engage the upper surface of said link to lock the plate in position. The rollers 14 are preferably formed with interior cored-out recesses 40 for lubricant, to obviate the necessity for frequent lubrication thereof.

The load carrying surface of the conveyor is formed by a plurality of apron sections each consisting of a conveyor pan or apron which extends between each opposed pair of the wider inner links 26 and welded thereto with a continuous weld along its lateral edges so as to form a tight seal which prevents leakage between the conveyor plate and the links, and to impart structural stability to the assembly. Each conveyor pan has a rearwardly inclined main portion 44, which forms a pocket for the material to be conveyed, a downwardly inclined forward flange 46, which forms an overlapping joint with the adjacent preceding apron, and an upwardly inclined rear flange 48, which cooperates to form a lapped joint with the flange 46 of the following apron. As each inner link 26 extends forwardly of and overlaps the adjacent inner link for a considerable extent, and as each pan is welded with a continuous weld along its entire side edge portions to its respective pair of links 26, the forward overlapping portion of each link is cut away as indicated at 41 to lie above the rear lower end of the inclined portion 44 of the adjacent forward pan and is also provided with a notch or slot 42 to provide clearance for the rear flange 48 of said pan. The length of each conveyor pan or apron and its relation to the shafts 22 is such that the forward flange 46 coincides with the forward edge of the notch 42, and the rear flange 48 projects with considerable clearance into the space formed by the notch and the forward flange, and also so that an ample clearance 50 is formed between the forward and rear flanges of successive conveyor pans through which material would have to pass upwardly a considerable distance to escape from the apron.

It will be noted that the adjacent flanges 46 and 48 are disposed a substantial distance forwardly of the shafts 22 and are substantially tangential to a circle having said distance as its radius and the axis of a shaft 22 as its center. A result of this construction, in addition to permitting the continuous welding of the conveyor pan to the link along its entire edges, is that when the conveyor passes through a vertical curve, as in passing over the sprocket 16, and the leading pan drops downwardly, flange 48 does not move into contact with flange 46, but instead swings downwardly and backwardly away from flange 46, following an arc of the circle above mentioned. This downward swinging movement of the flange 48 results from the swinging of the rear end of each apron section about the shaft 22 upon which said rear end is pivoted and during the travel of the apron from its horizontal position to the sharply inclined positions indicated in Fig. 6. During the first part of the downward movement of each apron, however, the forward and rearward flanges remain in overlapping arrangement and it is not until the aprons pass around the sprocket to be inclined nearly at an angle of 45° to the horizontal, as shown in Fig. 6, that the adjacent flanges 46 and 48 become widely separated, and as the lower edge of flange 46 is well above and entirely clear of the upper edge of flange 48, any material which might have become lodged between said flanges is then completely freed to slide down the sharply inclined apron bottoms as the aprons pass around the sprocket, and to drop freely when the apron reaches the fully inverted position indicated at A at which point the flange 46 of the trailing apron is still fully clear of the adjacent flange 48 of apron A. It will therefore be seen that there is no possibility at any time for the material to be compressed between the overlapping positions of adjacent aprons or for any progressive compression or wedging such as would produce objectionable binding effects or distortion of the overlapping edge portions of the aprons.

As hereinbefore described, it is more or less customary practice to construct the apron sections of sheet steel and, although the apron sections of the conveyor shown are described as preferably being formed of separate sheet sections with the bottom plates integrally united to the side plates 26 with a continuous weld, it will be perfectly obvious that the apron sections could be made as castings with the side plates 26 thereof formed integrally with the bottom plates and so that no open space or joint is left between the bottom plate and side plates through which the material being conveyed could seep or leak. The arrangement of the side plates 26 with one end thereof offset inwardly from the other end and so that, as shown in Fig. 1, the forward end of each apron section fits with a neat sliding fit within the overlapping rearward end of the immediately preceding apron section, enables all of the apron sections to be made of precisely the same construction, thus resulting in desired standardization, economy of manufacture and facility of assembly. Furthermore, this construction enables smaller working clearances to be adopted which, in turn, insures that the overlapping portions of the side plates of the conveyor sections may have a sufficiently close fit to prevent any leaking or seeping of the material between such overlapped portions. As each apron has the lateral or side edges of its bottom plate integrally united with the side plates 26 thereof, either by securing the bottom plate to the side plates with a continuous weld or by making the apron sections as an integral one-piece casting, there can be no possibility of any leakage of the material being conveyed between the side plates and the bottom plate of each individual apron section.

Although the invention has been described with particular reference to the embodiment shown in the drawings, it is not limited thereto, but may be considerably modified by those skilled in the art without departing from the spirit of the invention as defined in the following claims.

I claim:

1. An apron conveyor of the type wherein a plurality of apron pans each consisting of a pair of side plates and a bottom plate are arranged in overlapping engagement to form a continuous supporting surface characterized by the forward end of said bottom plate terminating in a downwardly extending flange and the rearward end thereof having an upwardly extending flange, both of said flanges extending substantially at right angles to the main material-supporting area of said bottom plate and said bottom plate of each apron being integrally united to each of said side plates with an unbroken joint extending along the entire length of the juncture between each of said side plates and both flanges of said bottom plate to completely seal the same and prevent leakage of material between said side plates and bottom plates, the forward end of each apron being narrower than its rearward end whereby it can extend between the rearward ends of the side plates of an adjacent apron with its downwardly extending flange overlapping the upwardly extending flange of the adjacent apron.

2. An apron conveyor of the type wherein a plurality of apron pans each consisting of a pair of side plates and a bottom plate are arranged in overlapping engagement to form a continuous supporting surface characterized by the forward end of each of said bottom plates terminating in a downward flange extending substantially at right angles to the main material-supporting area of said bottom plate and said bottom plate of each apron terminating at its rear end in an upwardly extending flange located behind the forward flange of the bottom plate of the adjacent apron in overlapping relation thereto and spaced rearwardly thereof to form a clearance space when said aprons are travelling along the substantially horizontally extending material-carrying run of said conveyor, and the bottom plate of each apron being in close contacting engagement along the entire side edges of its forward and rearward flanges as well as of its main portion with its respective pair of side plates, and means for pivotally connecting the forward portion of each apron to the rearward portion of an adjacent apron, the forward end of each apron being narrower than its rearward end whereby it can extend between the rearward ends of the side plates of the adjacent apron, the forward ends of said side plates being relieved below the bottom plates and behind the forward flange to provide clearance for the upwardly extending flange of the adjacent apron.

3. An apron conveyor of the type wherein a plurality of apron pans each consisting of a pair of side plates and a bottom plate are arranged in overlapping engagement to form a continuous supporting surface characterized by the forward end of each of said bottom plates terminating in a downward flange extending substantially at right angles to the main material-supporting area of said bottom plate and in close contacting engagement at its ends with said side plates, and said bottom plate of each apron terminating at its rear edge in an upwardly extending flange located behind the forward flange of the bottom plate of the adjacent apron in overlapping relation thereto and spaced rearwardly thereof to form a clearance space, the bottom plate of each apron being in close contacting engagement along the entire side edges of its foward and rearward flanges as well as of its main portion with its respective pair of said plates, and means for pivotally connecting the forward portion of each apron to the rearward portion of an adjacent apron, the forward end of each apron being narrower than its rearward end whereby it can extend between the rearward ends of the side plates of the adjacent apron, the forward ends of said side plates being relieved blow the bottom plates and behind the forward flange to provide clearance for the upwardly extending flange of the adjacent apron.

4. An apron conveyor of the type wherein a plurality of apron pans each consisting of a pair of side plates and a bottom plate are arranged in overlapping engagement to form a continuous supporting surface characterized by the forward end of each of said bottom plates terminating in a downward flange extending substantially at right angles to the main material-supporting area of said bottom plate and in contacting engagement at its ends with said side plates, each of said aprons being pivotally supported upon a transverse shaft which extends underneath said bottom plate and projects at its end through said side plates, a pair of supporting rollers mounted upon the projecting ends of said shaft, tracks upon which said rollers are supported, sprockets for engaging said rollers, and reversing the line of travel of said conveyor, means for pivotally connecting the forward portion of each apron to the rearward portion of an adjacent apron, the bottom plate of each apron terminating in an upwardly extending flange located behind the forward flange of the bottom plate of the adjacent apron, and in overlapping relation thereto and spaced rearwardly thereof to form a clearance space when said aprons are travelling along the substantially horizontally extending material-carrying run of said conveyor, and each of said side plates of each apron being provided immediately to the rear of the forward flange of said bottom plate with a cut-out notch in which the ends of the rearward flange of the bottom plate of the adjacent apron projects when said aprons are travelling along the substantially horizontally extending material-carrying run of said conveyor.

5. An apron conveyor of the type wherein a plurality of apron pans each consisting of a pair of side plates and a bottom plate are arranged in overlapping engagement to form a continuous supporting surface characterized by the forward end of each of said bottom plates terminating at its forward end in a downwardly extending flange and at its rearward end in an upwardly extending flange, both of said flanges extending substantially at right angles to the main material-supporting area of said bottom plate and said bottom plate being integrally united along its entire side edges to its respective pair of side plates, means for pivotally connecting the forward portion of each apron to the rearward portion of an adjacent apron, each of the side plates of each apron having a downwardly open notch therein located behind the forward flange of said bottom plate, the upwardly extending rearward flange of each bottom plate being located behind the forward flange of the bottom plate of the adjacent apron in overlapping relation thereto and spaced rearwardly thereof to form a clearance space and projecting into the notches of said side plates when said aprons are travelling along the substantially horizontally extending material-carrying run of said conveyor, and when said aprons pass around said sprockets the movement of each apron relative to the movement of the rearward flange of the adjacent apron being such that said rearward flange moves entirely out of said notch and entirely clear of overlapping engagement with said forward flange of said adjacent apron thereby to permit free release and discharge of any material carried by said apron which may have accumulated between said flanges.

JESSE E. McBRIDE.

REFERENCES CITED

The following references are of record in the file of this patent:

UNITED STATES PATENTS

| Number | Name | Date |
|---|---|---|
| 667,192 | Craig | Feb. 5, 1901 |
| 1,432,076 | Mellin | Oct. 17, 1922 |